(12) United States Patent  (10) Patent No.: US 8,353,193 B2
Johnson (45) Date of Patent: Jan. 15, 2013

(54) MANDREL ASSEMBLY AND METHOD OF USING THE SAME

(75) Inventor: Timothy H. Johnson, Seattle, WA (US)

(73) Assignee: Fatigue Technology, Inc., Seattle, WA (US)

( * ) Notice: Subject to any disclaimer, the term of this patent is extended or adjusted under 35 U.S.C. 154(b) by 0 days.

(21) Appl. No.: 13/047,651

(22) Filed: Mar. 14, 2011

(65) Prior Publication Data

US 2012/0036913 A1 Feb. 16, 2012

Related U.S. Application Data

(63) Continuation of application No. 12/389,304, filed on Feb. 19, 2009, now Pat. No. 7,926,319, which is a continuation of application No. 11/648,704, filed on Dec. 28, 2006, now Pat. No. 7,509,829.

(60) Provisional application No. 60/754,738, filed on Dec. 28, 2005.

(51) Int. Cl.
*B21D 41/02* (2006.01)

(52) U.S. Cl. ... 72/393; 72/370.05; 72/391.4; 72/453.19; 72/479; 29/523

(58) Field of Classification Search .................. 72/391.2, 72/392, 393, 453.19, 479, 391.4, 391.6, 453.16; 29/507, 523
See application file for complete search history.

(56) References Cited

U.S. PATENT DOCUMENTS

| 295,593 A | 3/1884 | Thayer |
| 810,430 A | 1/1906 | Pfluger et al. |
| 1,081,496 A | 12/1913 | Gillmor |
| 1,106,964 A | 8/1914 | Pahler |
| 1,226,090 A | 5/1917 | Ludlum |
| 1,297,142 A | 3/1919 | Gibbons |
| 1,480,298 A | 1/1924 | Pearson |
| 1,881,867 A | 10/1932 | Nelson |
| 1,979,686 A | 11/1934 | Hall et al. |
| 2,092,358 A | 9/1937 | Robertson |
| 2,146,461 A | 2/1939 | Bettington |

(Continued)

FOREIGN PATENT DOCUMENTS

DE 2203217 7/1973
(Continued)

OTHER PUBLICATIONS

Merriam Webster's Collegiate Dictionary, Tenth Edition, 1997, p. 154. (1).

*Primary Examiner* — David B Jones
(74) *Attorney, Agent, or Firm* — Seed IP Law Group PLLC

(57) ABSTRACT

A mandrel assembly has a mandrel, a biasing member, and a outer member. The biasing member biasly maintains the outer member in a first position, which corresponds to a contoured portion of the mandrel, when the outer member is either on the access or the blind side of a workpiece. The biasing member is compressible to allow the outer member to move into a second position as the outer member is moved through an opening in the workpiece. In the first position, the outer member includes a maximum outer circumference that is larger than the opening of the structural workpiece. In the second position, the outer member includes a maximum outer circumference that fits within the opening of the structural workpiece.

17 Claims, 14 Drawing Sheets

U.S. PATENT DOCUMENTS

| | | | |
|---|---|---|---|
| 2,150,361 A | 3/1939 | Chobert | |
| 2,188,596 A | 1/1940 | Hobert | |
| 2,275,451 A | 3/1942 | Maxwell | |
| 2,357,123 A | 8/1944 | Maxwell | |
| 2,385,294 A | 9/1945 | Lowy | |
| 2,405,399 A | 8/1946 | Bugg et al. | |
| 2,430,554 A | 11/1947 | Bugg et al. | |
| 2,433,425 A | 12/1947 | Burckle | |
| 2,468,985 A | 5/1949 | Krotz | |
| 2,528,180 A | 10/1950 | Roehl | |
| 2,583,719 A | 1/1952 | White | |
| 2,608,751 A | 9/1952 | Hutton | |
| 2,661,182 A | 12/1953 | Kipp | |
| 2,672,175 A | 3/1954 | Howard | |
| 2,695,446 A | 11/1954 | Meyer | |
| 2,700,172 A | 1/1955 | Rohe | |
| 2,808,643 A | 10/1957 | Weatherhead, Jr. | |
| 2,943,667 A | 7/1960 | Ewing et al. | |
| 3,128,999 A | 4/1964 | Schmitt | |
| 3,137,887 A | 6/1964 | Mannino et al. | |
| 3,149,860 A | 9/1964 | Hallesy | |
| 3,164,054 A | 1/1965 | Biesecker | |
| 3,244,034 A | 4/1966 | Severdia | |
| 3,252,493 A | 5/1966 | Smith | |
| 3,345,730 A | 10/1967 | Laverty | |
| 3,358,492 A | 12/1967 | Richter | |
| 3,399,435 A | 9/1968 | Ackerman | |
| 3,434,746 A | 3/1969 | Watts | |
| 3,498,648 A | 3/1970 | Hallesy | |
| 3,537,163 A | 11/1970 | Steidl | |
| 3,566,662 A | 3/1971 | Champoux | |
| 3,601,771 A | 8/1971 | Dozier | |
| 3,674,292 A | 7/1972 | Demler, Sr. | |
| 3,677,684 A | 7/1972 | Platz | |
| 3,693,247 A | 9/1972 | Brown | |
| 3,695,324 A | 10/1972 | Gulistan | |
| 3,763,541 A | 10/1973 | Jaffe | |
| 3,778,090 A | 12/1973 | Tobin | |
| 3,787,945 A | 1/1974 | Pasek et al. | |
| 3,820,297 A | 6/1974 | Hurd | |
| 3,835,525 A | 9/1974 | King, Jr. | |
| 3,875,649 A | 4/1975 | King, Jr. | |
| 3,892,121 A | 7/1975 | Champoux et al. | |
| 3,895,409 A | 7/1975 | Kwatonowski | |
| 3,915,052 A | 10/1975 | Ruhl | |
| 3,934,325 A | 1/1976 | Jaffe | |
| 3,943,748 A | 3/1976 | King, Jr. | |
| 3,949,535 A | 4/1976 | King, Jr. | |
| 3,997,193 A | 12/1976 | Tsuda et al. | |
| 4,003,288 A | 1/1977 | Jeal | |
| 4,044,591 A | 8/1977 | Powderley | |
| 4,143,580 A | 3/1979 | Luhm | |
| 4,164,807 A | 8/1979 | King, Jr. | |
| 4,187,708 A | 2/1980 | Champoux | |
| 4,237,768 A | 12/1980 | Volkmann | |
| 4,249,786 A | 2/1981 | Mahoff | |
| 4,355,612 A | 10/1982 | Luksch | |
| 4,386,515 A * | 6/1983 | Starke | 72/391.4 |
| 4,397,061 A | 8/1983 | Kanzaka | |
| 4,405,256 A | 9/1983 | King, Jr. | |
| 4,423,619 A | 1/1984 | Champoux | |
| 4,425,780 A | 1/1984 | Champoux | |
| 4,447,944 A | 5/1984 | Mohrman | |
| 4,471,643 A | 9/1984 | Champoux et al. | |
| 4,482,089 A | 11/1984 | Lindahl et al. | |
| 4,491,358 A | 1/1985 | Choung | |
| 4,494,398 A * | 1/1985 | Svoboda | 72/393 |
| 4,522,378 A | 6/1985 | Nelson | |
| 4,524,600 A | 6/1985 | Champoux et al. | |
| 4,530,527 A | 7/1985 | Holmberg | |
| 4,557,033 A | 12/1985 | Champoux | |
| 4,583,388 A | 4/1986 | Hogenhout | |
| 4,597,282 A * | 7/1986 | Hogenhout | 72/370.08 |
| 4,640,479 A | 2/1987 | Shely et al. | |
| 4,665,732 A | 5/1987 | Hogenhout | |
| 4,699,212 A | 10/1987 | Andersson et al. | |
| 4,755,904 A | 7/1988 | Brick | |
| 4,759,237 A | 7/1988 | Fauchet et al. | |
| 4,787,793 A | 11/1988 | Harris | |
| 4,809,420 A | 3/1989 | Landy et al. | |
| 4,869,091 A * | 9/1989 | Shemeta | 72/393 |
| 4,872,332 A * | 10/1989 | Potzas | 72/393 |
| 4,885,829 A | 12/1989 | Landy | |
| 4,905,766 A | 3/1990 | Dietz et al. | |
| 4,934,038 A * | 6/1990 | Caudill | 72/393 |
| 4,934,170 A | 6/1990 | Easterbrook et al. | |
| 4,985,979 A | 1/1991 | Speakman | |
| 4,999,896 A | 3/1991 | Mangus et al. | |
| 5,038,596 A | 8/1991 | Noonan et al. | |
| 5,069,586 A | 12/1991 | Casey | |
| 5,083,363 A | 1/1992 | Ransom et al. | |
| 5,093,957 A | 3/1992 | Do | |
| 5,096,349 A | 3/1992 | Landy et al. | |
| 5,103,548 A | 4/1992 | Reid et al. | |
| 5,110,163 A | 5/1992 | Benson et al. | |
| 5,127,254 A | 7/1992 | Copple et al. | |
| 5,129,253 A | 7/1992 | Austin et al. | |
| 5,207,461 A | 5/1993 | Lasko | |
| 5,218,854 A | 6/1993 | Jarzebowicz et al. | |
| 5,245,743 A | 9/1993 | Landy et al. | |
| 5,253,773 A | 10/1993 | Choma et al. | |
| 5,305,627 A | 4/1994 | Quincey et al. | |
| 5,341,559 A | 8/1994 | Reid et al. | |
| 5,380,111 A | 1/1995 | Westrom | |
| 5,380,136 A | 1/1995 | Copple et al. | |
| 5,390,808 A | 2/1995 | Choma et al. | |
| 5,405,228 A | 4/1995 | Reid et al. | |
| 5,433,100 A | 7/1995 | Easterbrook et al. | |
| 5,466,016 A | 11/1995 | Briody et al. | |
| 5,468,104 A | 11/1995 | Reid et al. | |
| 5,478,122 A | 12/1995 | Seabra | |
| 5,496,140 A | 3/1996 | Gossmann et al. | |
| 5,607,194 A | 3/1997 | Ridenour | |
| 5,609,434 A | 3/1997 | Yehezkieli et al. | |
| 5,713,611 A | 2/1998 | Kurimoto et al. | |
| 5,722,312 A | 3/1998 | Kristensen | |
| 5,806,173 A | 9/1998 | Honma et al. | |
| 5,885,318 A | 3/1999 | Shimizu et al. | |
| 5,943,898 A | 8/1999 | Kuo | |
| 5,947,326 A | 9/1999 | O'Hern et al. | |
| 6,058,562 A | 5/2000 | Satou et al. | |
| 6,077,010 A | 6/2000 | Reid et al. | |
| 6,131,964 A | 10/2000 | Sareshwala | |
| 6,183,180 B1 | 2/2001 | Copple et al. | |
| 6,217,082 B1 | 4/2001 | Orcutt et al. | |
| 6,266,991 B1 | 7/2001 | Kuo | |
| 6,289,577 B1 | 9/2001 | Tanaka et al. | |
| 6,325,582 B1 | 12/2001 | Sadri et al. | |
| 6,328,513 B1 | 12/2001 | Niwa et al. | |
| 6,347,663 B1 | 2/2002 | Hunzinger et al. | |
| 6,487,767 B1 | 12/2002 | Reid et al. | |
| 6,488,460 B1 | 12/2002 | Smith et al. | |
| 6,499,926 B2 | 12/2002 | Keener | |
| 6,537,005 B1 | 3/2003 | Denham | |
| 6,623,048 B2 | 9/2003 | Castel et al. | |
| 6,651,301 B1 | 11/2003 | Liu | |
| 6,705,149 B2 * | 3/2004 | Cobzaru et al. | 72/391.4 |
| 6,761,380 B2 | 7/2004 | Pachciarz et al. | |
| 6,773,039 B2 | 8/2004 | Muenster et al. | |
| 6,796,765 B2 | 9/2004 | Kosel et al. | |
| 6,826,820 B2 | 12/2004 | Denham et al. | |
| RE38,788 E | 9/2005 | Satou et al. | |
| 6,990,722 B2 | 1/2006 | Reid et al. | |
| 7,024,908 B2 | 4/2006 | Poast et al. | |
| 7,024,909 B2 * | 4/2006 | Cobzaru et al. | 72/393 |
| 7,047,596 B2 | 5/2006 | Sucic et al. | |
| 7,059,816 B2 | 6/2006 | Toosky | |
| 7,100,264 B2 | 9/2006 | Skinner et al. | |
| 7,156,051 B2 | 1/2007 | Lorton et al. | |
| 7,273,338 B2 | 9/2007 | Summerlin | |
| 7,325,796 B2 | 2/2008 | Moreland | |
| 7,375,277 B1 | 5/2008 | Skinner et al. | |
| 7,406,777 B2 | 8/2008 | Grover et al. | |
| 7,448,652 B2 | 11/2008 | Poast et al. | |
| 7,509,829 B2 * | 3/2009 | Johnson | 72/393 |
| 7,617,712 B2 | 11/2009 | Glenn | |
| 7,641,430 B2 | 1/2010 | Johnson et al. | |

| | | | |
|---|---|---|---|
| 7,695,226 B2 | 4/2010 | March et al. | |
| 7,926,318 B2 | 4/2011 | Glenn | |
| 7,926,319 B2 * | 4/2011 | Johnson | 72/393 |
| 8,069,699 B2 * | 12/2011 | Glenn et al. | 72/391.4 |
| 8,191,395 B2 | 6/2012 | Glenn | |
| 2003/0110618 A1 | 6/2003 | Magnuson | |
| 2004/0111864 A1 | 6/2004 | Skinner et al. | |
| 2004/0213492 A1 | 10/2004 | Kim et al. | |
| 2005/0000081 A1 | 1/2005 | Reid et al. | |
| 2005/0025601 A1 | 2/2005 | Poast et al. | |
| 2005/0262682 A1 | 12/2005 | Grover et al. | |
| 2006/0045649 A1 | 3/2006 | Johnson et al. | |
| 2006/0251490 A1 | 11/2006 | Kleinman et al. | |
| 2007/0048107 A1 | 3/2007 | Johnson et al. | |
| 2007/0110541 A1 | 5/2007 | Rawlins et al. | |
| 2007/0289351 A1 | 12/2007 | Glenn | |
| 2007/0295050 A1 | 12/2007 | Glenn | |
| 2008/0005887 A1 | 1/2008 | Glenn et al. | |
| 2008/0034831 A1 | 2/2008 | Glenn | |
| 2008/0066518 A1 | 3/2008 | Glenn et al. | |
| 2008/0250603 A1 | 10/2008 | Skinner et al. | |
| 2009/0304315 A1 | 12/2009 | Johnson | |
| 2010/0000280 A1 | 1/2010 | Reid et al. | |
| 2010/0260572 A1 | 10/2010 | Wehrmeister et al. | |

FOREIGN PATENT DOCUMENTS

| | | |
|---|---|---|
| DE | 33 01 849 C1 | 7/1984 |
| DE | 3545554 A1 | 7/1987 |
| DE | 89 01 317 U1 | 3/1989 |
| EP | 0 054 592 A1 | 6/1982 |
| EP | 0 140 516 A1 | 5/1985 |
| EP | 0 248 122 A2 | 12/1987 |
| EP | 0 785 366 A1 | 7/1997 |
| EP | 0 891 007 A1 | 1/1999 |
| EP | 0 945 919 B1 | 9/1999 |
| EP | 1166951 A1 | 1/2002 |
| EP | 1 202 458 A1 | 5/2002 |
| EP | 1525952 A1 | 4/2005 |
| EP | 1611976 A1 | 1/2006 |
| EP | 1 872 895 A2 | 1/2008 |
| EP | 1 903 221 A2 | 3/2008 |
| FR | 2645052 | 10/1990 |
| GB | 593607 | 10/1947 |
| GB | 1395009 | 5/1975 |
| GB | 2 239 917 A | 7/1991 |
| JP | 57137031 | 8/1982 |
| JP | 60238046 A | 11/1985 |
| JP | 61157846 | 7/1986 |
| JP | 10-274366 | 10/1998 |
| JP | 10-299735 | 11/1998 |
| JP | 2001-177964 | 6/2001 |
| SU | 632463 | 11/1978 |
| WO | 8400120 A1 | 1/1984 |
| WO | 91/11273 A1 | 8/1991 |
| WO | 00 28221 A2 | 5/2000 |
| WO | 02059489 A1 | 8/2002 |
| WO | 2006132936 A1 | 12/2006 |
| WO | 2007082077 A1 | 7/2007 |
| WO | 2007121932 A1 | 11/2007 |
| WO | 2010/009442 A2 | 1/2010 |

* cited by examiner

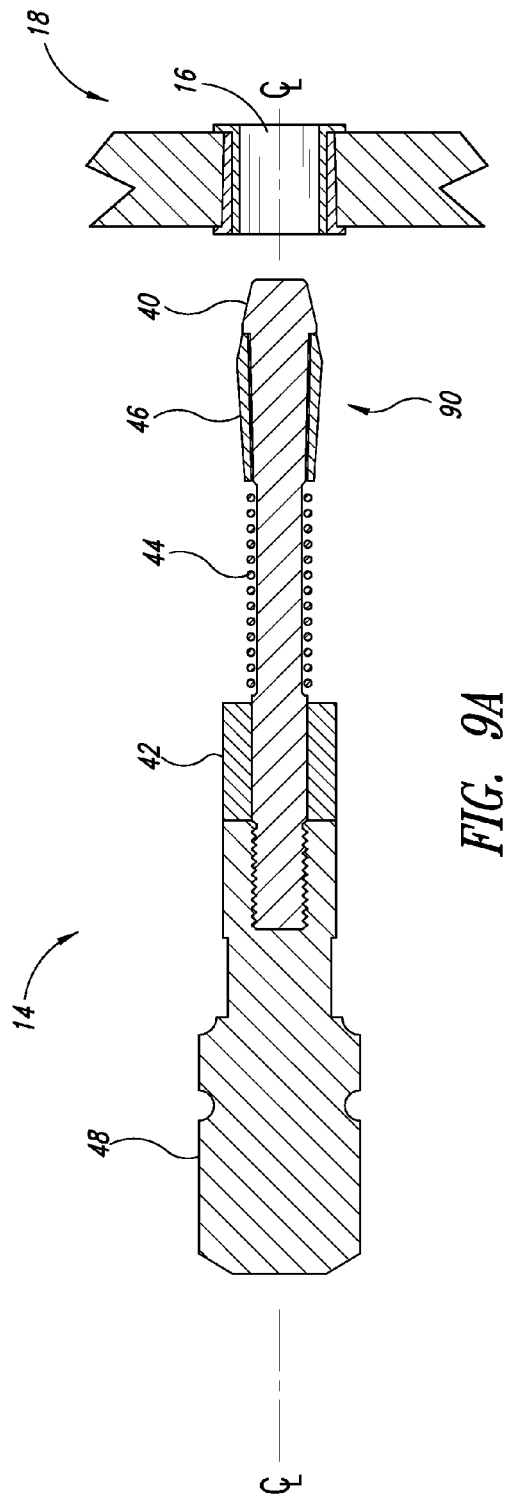
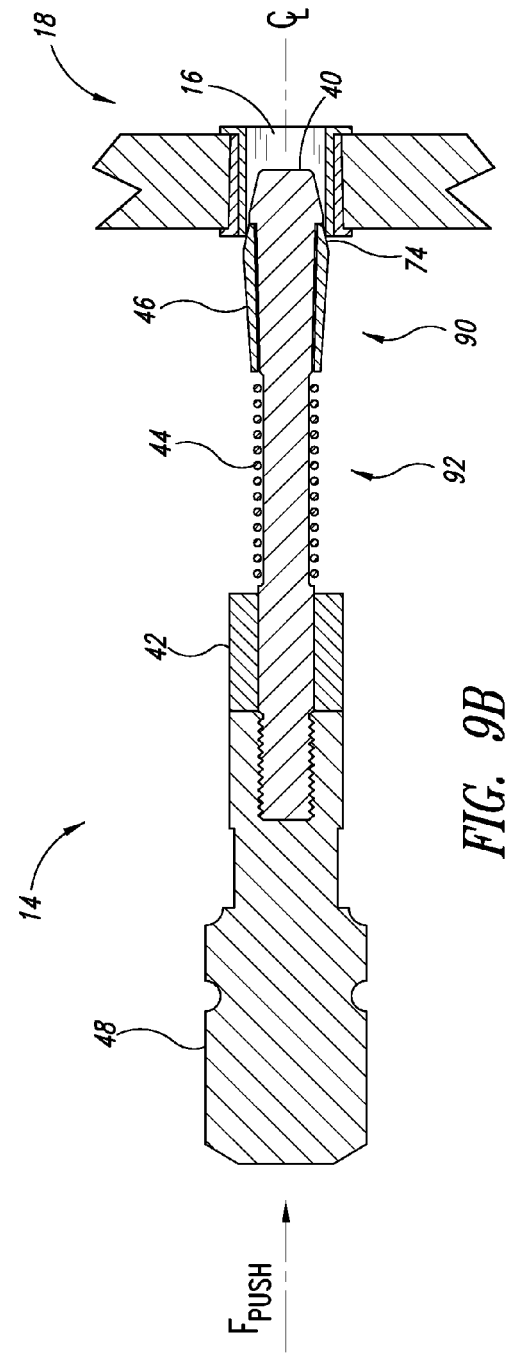
FIG. 9A
FIG. 9B

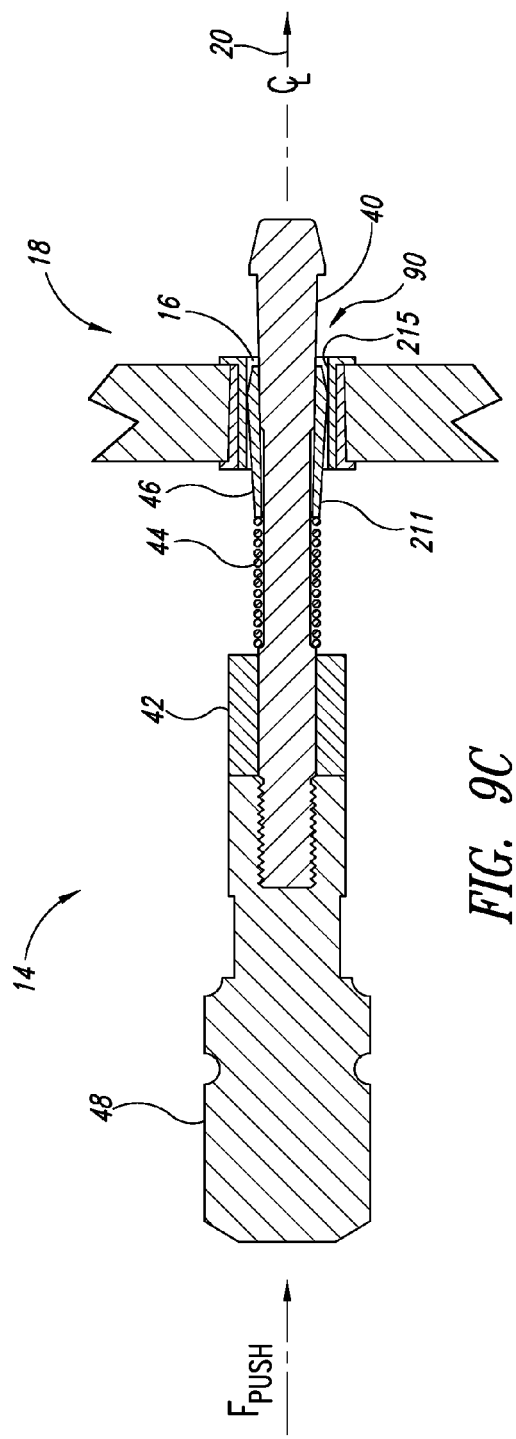
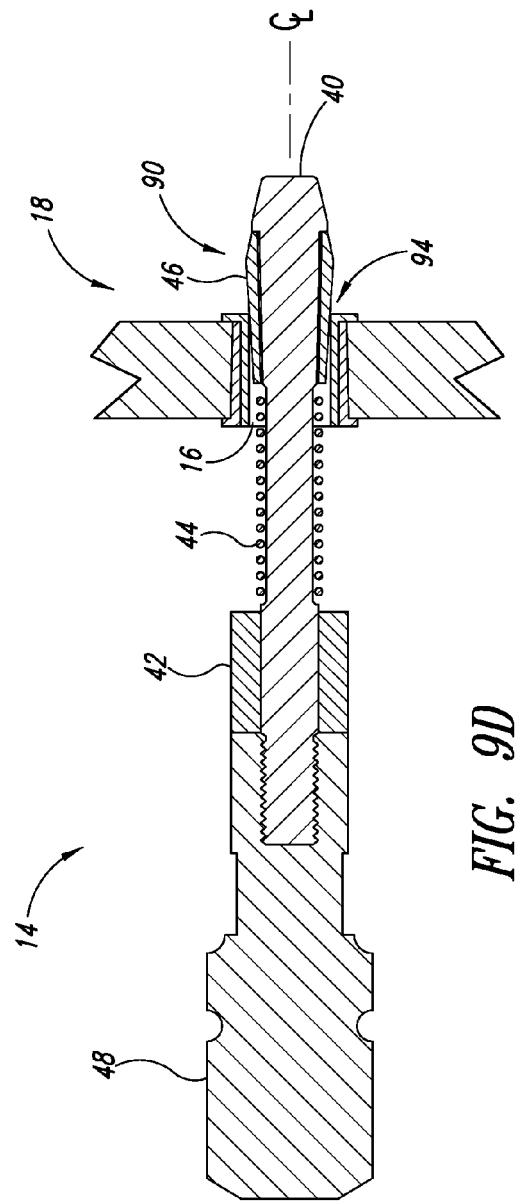
FIG. 9C
FIG. 9D

MANDREL ASSEMBLY AND METHOD OF USING THE SAME

CROSS-REFERENCES TO RELATED APPLICATIONS

This application is a continuation of U.S. patent application Ser. No. 12/389,304, filed on Feb. 19, 2009, which is a continuation of U.S. patent application Ser. No. 11/648,704, filed on Dec. 28, 2006, now U.S. Pat. No. 7,509,829 which issued on Mar. 31, 2009, which claims the benefit under 35 U.S.C. §119(e) of U.S. Provisional Patent Application No. 60/754,738 filed on Dec. 28, 2005. All these applications and U.S. patent are incorporated herein by reference in their entireties.

BACKGROUND OF THE DISCLOSURE

1. Field of the Disclosure

This disclosure generally relates to a mandrel assembly for radially expanding an opening in a structural workpiece.

2. Description of the Related Art

Aircraft and other metal structures are made up of a number of components that are typically riveted or bolted together. Drilling openings in the various structural workpieces of the aircraft is a necessary part of the assembly process and may also be done when maintaining the aircraft over its lifetime. During the aircraft assembly process, openings are necessary to attach structural workpieces together and/or to attach components to the structural workpieces. For example, openings in the structural workpiece are used to install bushings, nut plate assemblies, fastener assemblies, fittings, a rotary actuator attached to a rear wing spar, and a variety of other components. For aircraft maintenance purposes, openings in the structural workpiece may be created as a means to stop or at least impede a fatigue crack that is propagating through the structural workpiece. This latter process is commonly referred to as "stop-drilling."

The presence of an opening in a structural workpiece creates a stress concentration in the region adjacent to the opening. Under cyclic tensile loads, the opening acts as a stress riser and is often the initiation site of a fatigue crack. In the case of stop drilling, the opening is drilled at the tip of the fatigue crack to at least temporarily impede the growth of the crack. Once initiated, a fatigue crack may propagate to a critical length, thus resulting in a fatigue failure of the structural workpiece and/or the detachment of a component attached thereto.

Whether attaching components to the structural workpiece or stop drilling, for example, the formation of the opening is typically accompanied by some form of cold expansion process to create a beneficial state of residual compressive stress around the opening. The cold expansion process usually employs a tapered mandrel forcibly drawn through the opening to cause a radial plastic flow of material in an annular zone around the opening. This plastic flow of material results in the residual compressive stresses and may extend up to one diameter beyond the edge of the opening. In one example, the process of installing a bushing includes pulling the tapered mandrel through the bushing to radially, plastically expand the bushing into the opening of the workpiece. This type of cold expansion process can also create an annular zone of residual compressive stress in the structural workpiece surrounding the bushing.

The cold expansion process using the tapered mandrel and an associated split sleeve is described in U.S. Pat. No. 3,566,662; U.S. Pat. No. 3,892,121; U.S. Pat. No. 4,471,643, and U.S. Pat. No. 5,083,363. In the foregoing references, the tapered mandrel includes an elongated rod having a first end region and a second end region. The first end region is generally fixed to a puller/installation tool, usually by a threaded engagement. The second end comprises an increasing diameter conical portion that is sized to closely pass through the opening when the second end is inserted therein. The split sleeve is placed on elongated portion of the rod, which is smaller in diameter than the second end. The split sleeve is moved into the opening after the second end of the mandrel has been inserted through the opening.

The inner diameter of the split sleeve is selected to be smaller than the second end of the mandrel so that, when the second end is pulled back through the opening, the second end radially expands the split sleeve into the opening and may indirectly expand the surrounding material of the structural workpiece. The split sleeve undergoes significant plastic deformation in order to effectively expand the material of the structural workpiece. The disposable split sleeve generally operates to reduce the mandrel pull force and shield the opening from contact frictional forces generated by the high interference of the expansion mandrel as it is inserted and/or extracted from the opening. In addition, the split sleeve may be available in a variety of sizes to achieve a proper radial expansion of the opening. Because the split sleeve is permanently deformed a substantial amount during extraction of the mandrel from the opening, the split sleeve is rendered unusable for further cold expansion operations.

One of the primary goals of the aforementioned mandrels is to provide a means to cold expand the opening in the structural workpiece from only one side of the workpiece. However, one of the drawbacks of using the split sleeve cold expansion process described above is that the split sleeve is a disposable part and is useable for only one operation. Since there are typically thousands of holes in the assembly of a commercial vehicle such as an airliner, the assembly plant must maintain a large inventory of split sleeves.

This problem is partially addressed in U.S. Pat. No. 4,557,033, which provides a mandrel that can be removably attached to the installation tool. However, the mandrel must be moved through the opening of the structural workpiece from the blind side of the workpiece. Hence, both sides of the workpiece must be accessible to use the removably attachable mandrel disclosed in the '033 patent.

Based on the foregoing, there is a need for a mandrel assembly that is removably attachable to an installation tool and that allows cold expansion of the opening from only an access side of the structural workpiece.

SUMMARY OF THE INVENTION

In some embodiments, a mandrel assembly receivable by an installation tool to operate on an opening in a workpiece comprises an inner elongated rod having an engagement section, a first section extending from the engagement section, and a second section extending from the first section. The expansion section extends from the second section. A head section is coupled to the expansion section with a shoulder formed therebetween. An outer member has a first end and a second end, the outer member slideably receivable by the expansion section of the inner elongated rod and axially movable along the inner elongated rod between a first position and a second position, the outer member configured to be in a first configuration for passing through the opening when in the first position and a second expanded configuration for expanding the opening when in the second position, the second end of the outer member engageable with the shoulder of the inner elongated rod to limit axial movement of the outer member relative to the inner elongated rod in a first direction.

In some other embodiments, an installation system to operate on an opening in a workpiece comprises an inner rod having an engagement section, a central section extending from the engagement section, a contoured diameter section extending from the central section, and a head section coupled to the contoured diameter section with a shoulder formed therebetween; a biasing member slideably receivable by at least a portion of the central section of the rod; and an outer member having a first end and a second end, the outer member receivable by the contoured diameter section of the rod, the first end of the outer member configured to operate with the biasing member, the second end of the outer member engageable with the shoulder of the head section of the rod to limit axial movement of the outer member in a first direction relative to the inner rod.

In some embodiments, a method of using a mandrel assembly comprises placing an outer member of the mandrel assembly in proximity to an opening of a structural workpiece, the outer member slideably moveable on an inner elongated rod between a first position and a second position, the first position corresponding to a expansion section of the inner elongated rod; slideably moving the outer member away from a head section of the inner elongated rod into the second position; moving at least a portion of the outer member completely through the opening in a first direction; after the outer member is moved through the opening in the first direction, forcing the outer member towards the first position to radially expand the outer member; and applying a pulling force to the mandrel assembly to forcibly pull the expanded outer member in a second direction generally opposite the first direction and back through the opening to cause a maximum circumference section of the outer member to radially expand a region of the structural workpiece around the opening.

In another embodiment, a method of using a mandrel assembly to expand an opening in a workpiece, the opening extending from a first side of the workpiece to a second side of the workpiece, the method comprising positioning a mandrel assembly on a first side of the workpiece, the mandrel assembly comprising an elongated rod and an outer member coupled to the elongated rod; moving a head of the elongated rod and at least a portion of the outer member in a first configuration through the opening in a first direction to the second side of the workpiece; causing the portion of the outer member on the second side of the workpiece to expand from the first configuration to a second configuration while the mandrel assembly extends through the opening, the outer member in the second configuration having an outer circumference that is greater than a circumference of the opening; and after expanding the outer member, moving the mandrel assembly in a second direction generally opposite the first direction such that the outer member radially expands opening.

In yet other embodiments, a mandrel assembly comprises radial expansion means for radially expanding a region around an opening in a structural workpiece, the radial expansion means having a first position and a second position, the first position occurring when a maximum outer circumference of the radial expansion means is larger than the opening, the second position occurring when the maximum outer circumference of the radial expansion means is sized to fit within the opening in a first direction; means for slideably supporting the radial expansion means; and means for moving the radial expansion means towards the first position while at least a portion of the radial expansion means is on an access side of the structural workpiece and while the radial expansion means is on an opposite side of the structural workpiece, the means for moving permitting the radial expansion means to move into the second position when the radial expansion means is moved through the opening.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIGS. 9A-9E are cross-sectional operational views of the mandrel assembly of FIG. 2 at successive intervals of operation to cold expand the opening of the structural workpiece, according to one illustrated embodiment.

DETAILED DESCRIPTION OF THE INVENTION

Figure 1A:
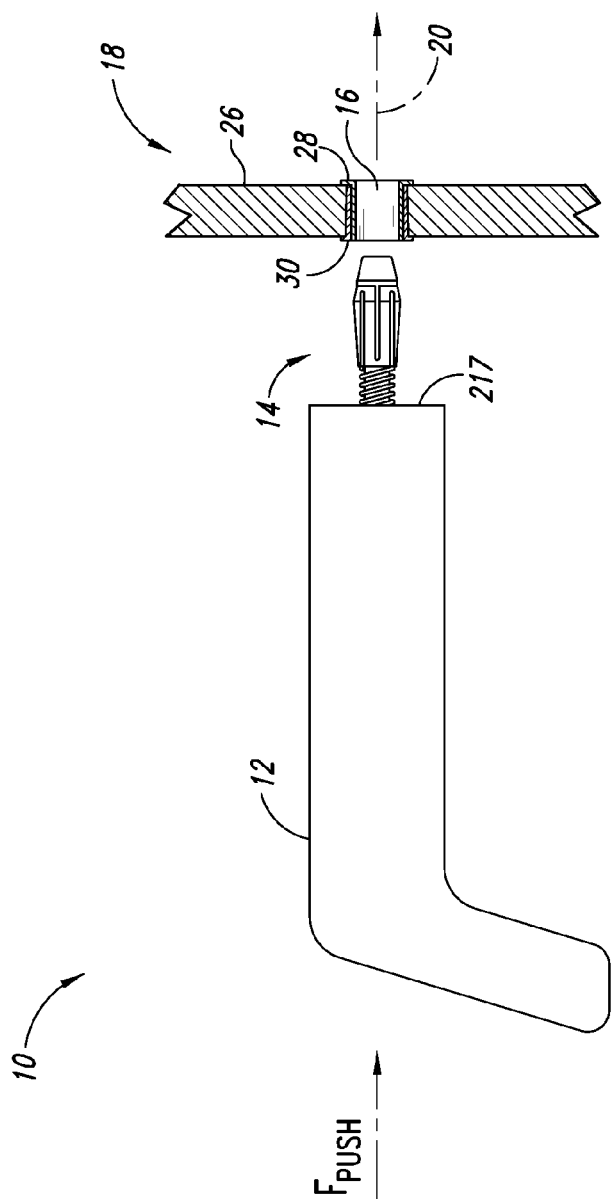
FIG. 1A is a side elevational view of a cold expansion system comprising an installation tool spaced from a structural workpiece, according to one illustrated embodiment.

In the following description, certain specific details are set forth in order to provide a thorough understanding of various embodiments disclosed herein. However, one skilled in the art will understand that the embodiments may be practiced without these details. In other instances, well-known structures associated with tooling that is used to cold work and/or install a structural member (e.g., a bushing installed into a composite panel) into an opening of a structural workpiece, expansion mandrels, and tooling adaptors have not necessarily been shown or described in detail to avoid unnecessarily obscuring descriptions of the disclosed embodiments. In addition, well-known methods and/or processes for cold expansion, stopping the growth of fatigue cracks, and/or installing structural members into the opening of a structural workpiece have also not necessarily been shown or described in detail to avoid unnecessarily obscuring descriptions of the embodiments herein. It is appreciated and understood that the process of installing a structural member into the opening of the structural workpiece may or may not result in the creation of an annular zone of residual compressive stress in the structural workpiece and/or other associated structure.

In the following description and for purposes of brevity, reference shall be made to cold expansion of the structural workpiece. This reference is not intended to limit or otherwise narrow the scope of the disclosure. The process of cold expansion is to be broadly interpreted as any process that radially expands at least some of the material surrounding an opening in a structural workpiece, even if the expansion is for the purpose of impeding the growth of a fatigue crack. It is further understood that cold expanding the opening of the structural workpiece may or may not induce beneficial compressive residual stresses and may or may not produce fatigue-enhancing benefits in the structural workpiece.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

The following description relates to a type mandrel assembly that can be removably attached to an installation tool. The mandrel assembly can expand an opening in a structural workpiece from only one side of the workpiece, and does not require a disposable split sleeve. As a general overview, the mandrel assembly includes a multi-use expandable outer member that is slideably supported along a tapered portion of a mandrel and biased to generally be in a first position. During operation of the mandrel assembly, the outer member is forcibly slid along the mandrel into a second position. As the outer member is moved into the second position, a maximum outer diameter of the outer member is radially reduced to allow the outer member to be easily inserted through the opening. Once the outer member is fully inserted through the opening, the outer member is moved back to the first position along the tapered portion of the mandrel. The tapered portion forces the maximum outer diameter of outer member to radially expand to a size larger than the diameter of the opening. The installation tool then pulls the mandrel, which includes the radially expanded outer member, back through the opening causing the diameter of the opening to radially expand. This process can be repeated to cold work any number of openings.

Installation System

Figure 1B:
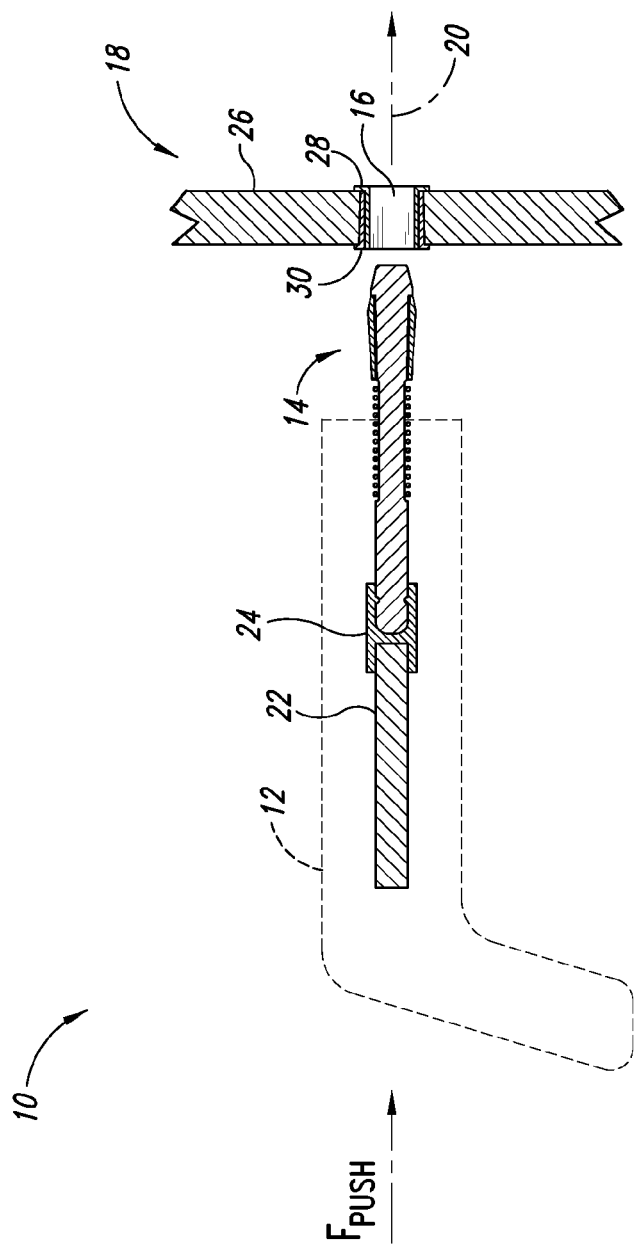
FIG. 1B is a cross-sectional view of a mandrel assembly for performing an expansion process, the mandrel assembly is coupled to an installation tool (shown in phantom), according to one illustrated embodiment.

FIGS. 1A and 1B show an installation system 10 having an installation tool 12 and a mandrel assembly 14 to cold expand an opening 16 in a structural workpiece 18 according to the illustrated embodiment. The mandrel assembly 14 is detachably coupled to the installation tool 12 and is operable to be initially pushed through the opening 16 in a first direction 20 with a limited amount of applied push-force "$F_{PUSH}$." The mandrel assembly 14 is then pulled through the opening 16 to expand the diameter of the opening 16.

In some embodiments, the installation tool 12 is a hydraulically actuated tool having an internal rod/piston arrangement that provides sufficient force to forcibly push and/or pull an outer member through the opening 16 of the structural workpiece 18. The installation tool 12 can include, without limitation, a puller (e.g., a hydraulic puller gun), a nosecap, an adapter, and other types of components used with installation tools. As shown in FIG. 1B, a rod 22 extending through the installation tool 12 is coupled to an adaptor 24. The adaptor 24 is integrally formed with or otherwise mechanically attached to the rod 22. In one embodiment, the adaptor 24 operates like a keyed or keyless chuck for a drill. Installation tools 12 and adaptors 24 are known in the art and will not be described in further detail in the interest of brevity. At least one embodiment of an installation tool 12 that could be used with the mandrel assembly 14 is described in U.S. Pat. No. 4,187,708.

The structural workpiece 18 is representative of any structure having an opening 16 formed therein. The structural workpiece 18 can include, but is not limited to, one or more composite materials (e.g., laminates, fiber reinforced composites, and the like), metal (e.g., steel, aluminum, titanium, and the like), polymers, plastics, and combinations thereof, as well as other types of materials suitable for being expanded. The structural workpiece 18 can be any type of structural component, for example, a panel, web, spar, rib, conduit fitting, bushing, grommet, sleeve, nut assembly for receiving a fastener, a sealing device for sealing the opening, and/or some other type of structure.

By way of example, the structural workpiece 18 is a fiber-reinforced composite panel 26 with a bushing assembly 27. The bushing assembly 27 includes an inner bushing 28 and an outer bushing 30 installed in the opening 16. The reference to the structural workpiece 18 in this exemplary embodiment can include the composite panel 26, the inner bushing 28, the outer bushing 30, or any combination of these or other components. In one embodiment, the mandrel assembly 14 is used to radially expand the inner bushing 28 and/or outer bushing 30 into the panel 26. Thus, it is understood that the structural workpiece 18, as illustrated, is not meant to limit or otherwise narrow the disclosed embodiments.

The Mandrel Assembly

Figure 2:
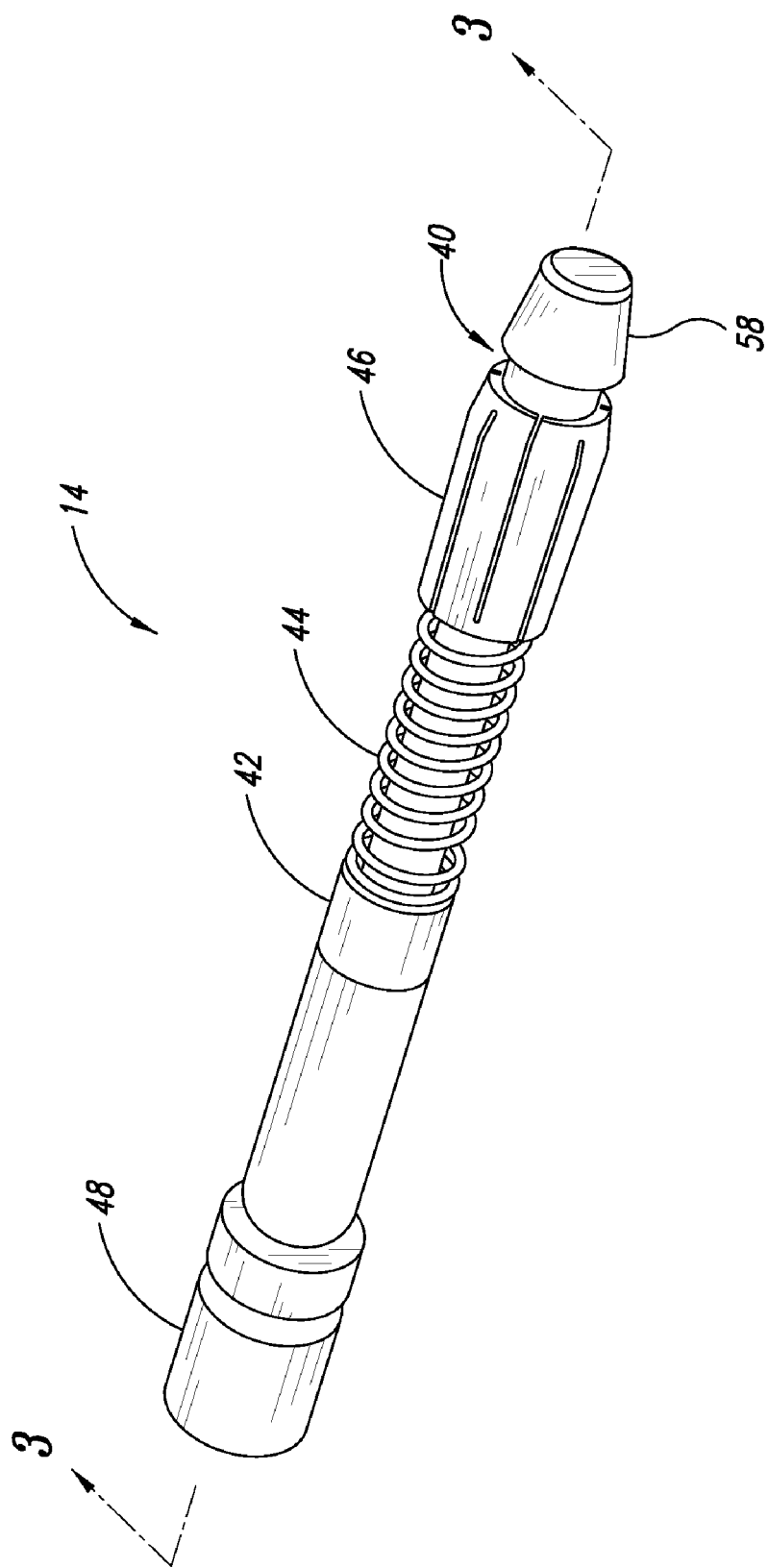
FIG. 2 is a front, top, left isometric view of the mandrel assembly of FIG. 1B having an inner elongated rod, a jam nut, a biasing member, a multi-use expandable outer member, and a tool-coupling member, according to one illustrated embodiment.
Figure 3:
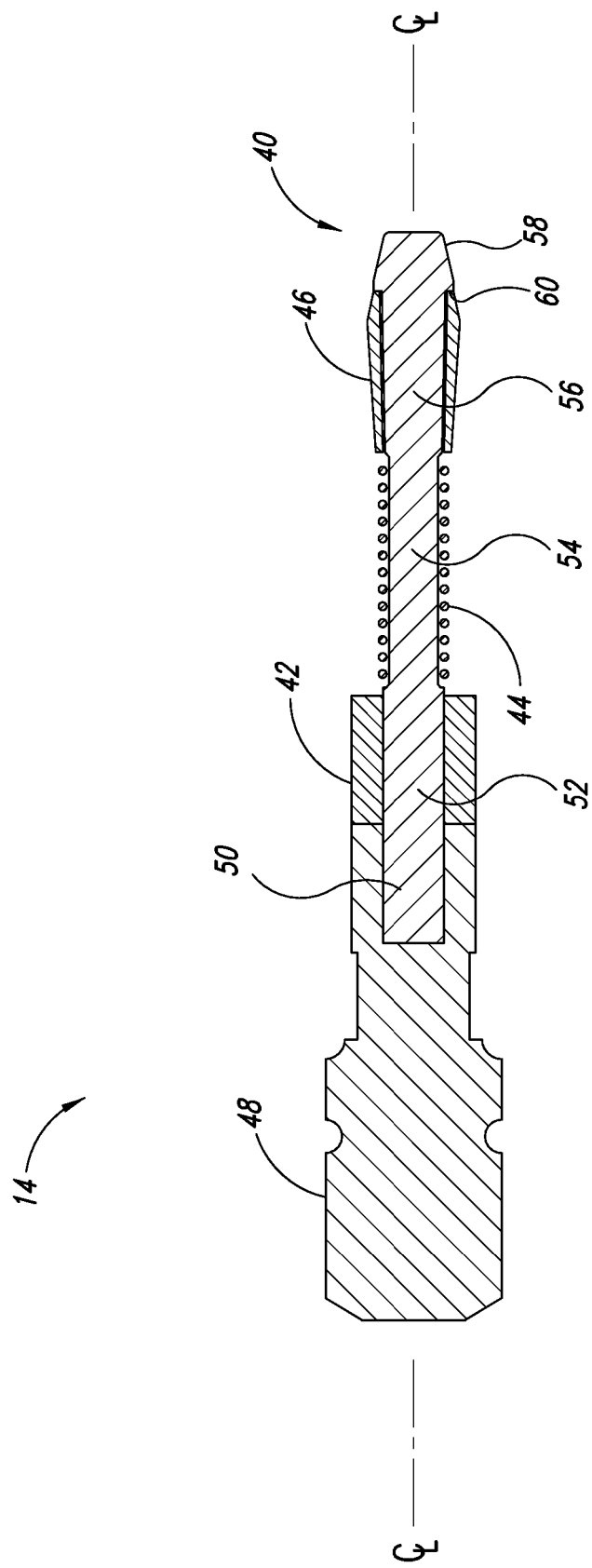
FIG. 3 is a cross-sectional view of the mandrel assembly of FIG. 2 taken along a line 3-3.

FIGS. 2 and 3 show the mandrel assembly 14 having an inner elongated rod 40, a jam nut 42, an actuator 44, an expandable outer member 46, and a tool-coupling member 48 according to one illustrated embodiment. The illustrated actuator 44 is in the form of a biasing member. The inner rod 40 is coupled to the tool-coupling member 48. The jam nut 42 is closely received by the inner rod 40 according to one embodiment. The biasing member 44 and outer member 46 are disposed on the inner rod 40 between the jam nut 42 and a head section 58 of the inner rod 40.

Figure 4A:
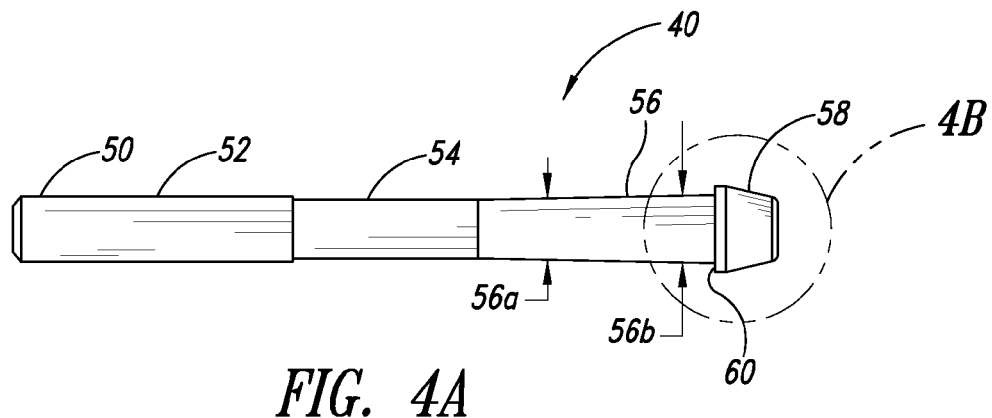
FIG. 4A is a side elevational view of the inner elongated rod of the mandrel assembly of FIG. 2, according to one illustrated embodiment.
Figure 4B:
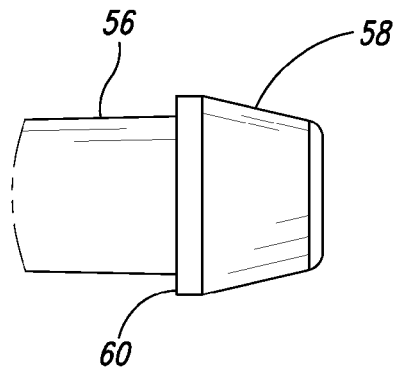
FIG. 4B is a detail view of a head section of the inner elongated rod of FIG. 4A.
Figure 4C:
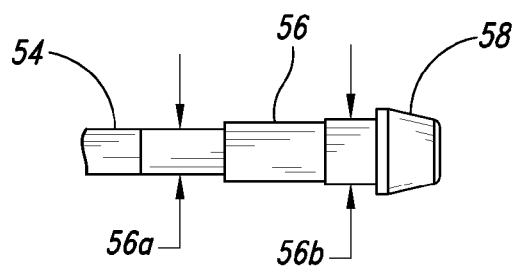
FIG. 4C is a partial side elevational view of a contoured section of an inner elongated rod according to one illustrated embodiment.

FIGS. 3, 4A, 4B, and 4C show various aspects of the inner rod 40. The inner rod 40 includes an engagement section 50, a first section 52 extending from the engagement section 50, a second section 54 extending from the first section 52, a contoured or expansion section 56 extending from the second section 54, and the head section 58 coupled to the contoured section 56. A shoulder 60 is formed between the contoured section 56 and the head section 58. The contoured section 56 of the inner rod 40 includes a first diameter 56a connected to a larger second diameter 56b. The contoured section 56 is uniformly tapered, according to the illustrated embodiment. In another embodiment, the contoured section 56 includes a stepped profile where the diameter of the contoured section 56 is stepped down or up in size (FIG. 4C). The contoured section 56 can have other configurations suitable for expanding the outer member 46 when the outer member is moved over the inner rod 40. The inner rod 40 is a monolithic part according to the illustrated embodiment.

Figure 5:
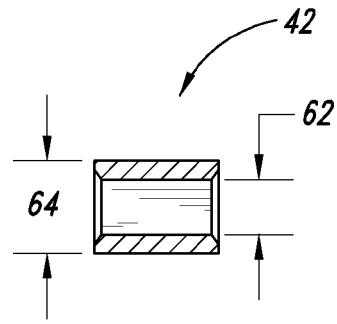
FIG. 5 is a longitudinal cross-sectional view of the jam nut of the mandrel assembly of FIG. 2, according to one illustrated embodiment.

FIGS. 3 and 5 show the jam nut 42 having an inner diameter 62 and an outer diameter 64. The inner diameter 62 is sized to be closely received by at least a portion of the first section 52 of the inner rod 40. In one embodiment, the jam nut 42 is press fit onto the first section 52 of the inner rod 40 to form an interference fit therewith. It is understood that other methods may be used to connect the jam nut 42 to the first section 52 of the inner rod 40. The amount of relative movement between the jam nut 42 and the inner rod 40 can be minimized, limited, or substantially prevented. During operation of the mandrel assembly 14, the jam nut 42 provides a reaction force for the biasing member 44 acting against the outer member 46. The outer diameter 64 is sized relative to the inner diameter 62 (i.e., the thickness of the jam nut 42) so as to maintain the biasing member 44 on the inner rod 40. For example, the outer diameter 64 can be sufficiently large to prevent the biasing member 44 from traveling over the outer diameter 64 of the jam nut 42 when the mandrel assembly 14 is in operation.

Briefly referring to FIG. 3, the biasing member 44 is located between the jam nut 42 and the outer member 46. The biasing member 44 acts to exert a force on and/or absorb energy from the outer member 46. The biasing member 44 can include one or more springs (e.g., helical springs, conical springs, and the like). In one embodiment, the biasing member 44 is a round-wire helical compression spring received by at least a portion of the second section 54 of the inner rod 40. In another embodiment, the biasing member 44 comprises nested round-wire springs. Although the embodiments illustrated herein show the biasing member 44 as a spring, it is understood that other mechanical devices known in the art that are capable of exerting force and/or absorbing energy can be used in place of the mechanical spring.

Figure 6A:
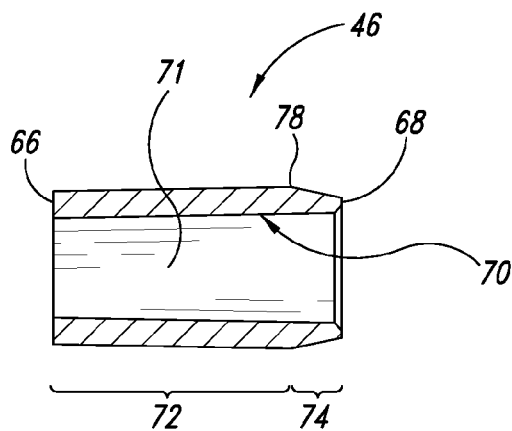
FIG. 6A is a longitudinal cross-sectional view of the multi-use expandable outer member of the mandrel assembly of FIG. 2, according to one illustrated embodiment.

FIGS. 2, 3, and 6A-6B show the outer member 46 according to one illustrated embodiment. FIG. 6A shows the outer member 46 having a first end 66, a second end 68, an inner surface 70, a first tapered section 72, and a second tapered section 74.

The first end 66 of the outer member 46 cooperates with the jam nut 42 to maintain the biasing member 44 therebetween as best seen in FIGS. 2 and 3. The second end 68 engages the shoulder 60 of the head section 58 of the inner rod 40. The shoulder 60 of the inner rod 40 can limit movement of the outer member 46 in the first direction 20 (FIG. 1A). In some embodiments, for example, the shoulder 60 serves as a stop that limits axial movement of the outer member 46 relative to the inner rod 40 when the inner rod 40 is pulled through the opening 16. The shoulder 60 can include, without limitation, one or more outwardly extending protrusions, flanges, or other structures suitable for limiting movement of the outer member 46 relative to the inner rod 40.

The inner surface 70 of the outer member 46 is complementarily formed to be slideably received by the contoured section 56 of the inner rod 40. The inner surface 70 defines a passageway 71 (FIG. 6A) that slightly increases in size from the first end 66 to the second end 68, according to the illustrated embodiment.

The first tapered section 72 increases in thickness from the first end 66 to an intermediate region 78. The intermediate region 78 includes the maximum outer diameter for the outer member 46. The second tapered section 74 decreases in thickness from the intermediate region 78 to the second end 68.

Figure 6B:
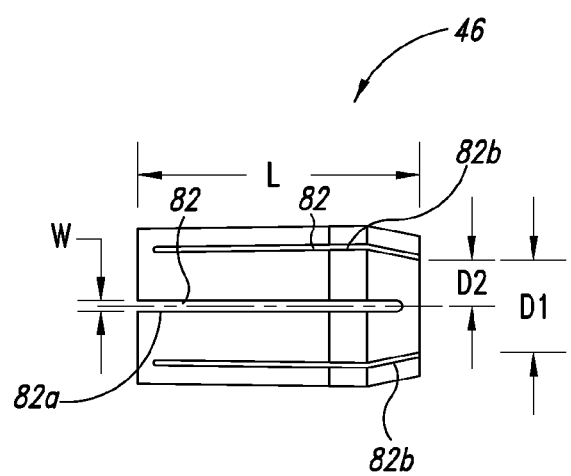
FIG. 6B is a longitudinal side-elevational view the expandable outer member of FIG. 6A.

FIG. 6B shows the outer member 46 with a plurality of longitudinal slots 82. In some embodiments, the number of longitudinal slots 82 ranges from about 4-16 slots. The longitudinal slots 82 enable the outer member 46 to radially expand and contract as the outer member 46 moves relative to the rod 40 (e.g., onto or off of the contoured section 56 of the inner rod 40 (FIG. 3)). Advantageously, the outer member 46 can be elastically expanded and contracted in order to perform a desired number of expansion processes. Such a reusable outer member 46 can cold work a desired number of work pieces resulting is less waste as compared to disposable one-time use sleeves.

Each longitudinal slot 82 extends through the radial thickness of the outer member, but extends only partially through the longitudinal length "L" of the outer member 46. A first set of longitudinal slots 82a extends from the first end 66 toward the second end 68 of the outer member 46. A second set of longitudinal slots 82b extends from the second end 68 toward the first end 66 of the outer member 46.

In the illustrated embodiment, there are four longitudinal slots 82a spaced "D1" equally apart by about ninety degrees) (90°) from one another about the circumference of the outer member 46. In addition, there are four longitudinal slots 82b spaced equally apart by about ninety degrees) (90°) from one another about the circumference of the outer member 46. The four longitudinal slots 82b are offset by a circumferential distance "D2" from the respective longitudinal slots 82a (e.g., forty-five degrees (45°)). In a non-limiting exemplary embodiment, the outer member 46 includes eight (8) longitudinal slots 82, each slot having a width "W" in the range of about 0.011 inches to about 0.014 inches (0.2794 mm-0.3556 mm). The length of the longitudinal slots 82 may be varied above or below the exemplary range depending on design objectives.

It is understood that the spacing "D1," the offset distance "D2," the width "W", the number of longitudinal slots 82, and the material (e.g., steel, tool steel, hardened steel, and the like) used to make the outer member 46 can be varied and/or changed to achieve a desired amount of radial and/or circumferential stiffness for the outer member 46 and/or to accommodate various degrees of taper for the contoured section 56 of the inner rod 40. The longitudinal slots 82 can be made by an electrical discharge machining (EDM) process or a similar process that is capable of achieving the desired design specifications of the outer member 46.

Figure 7:
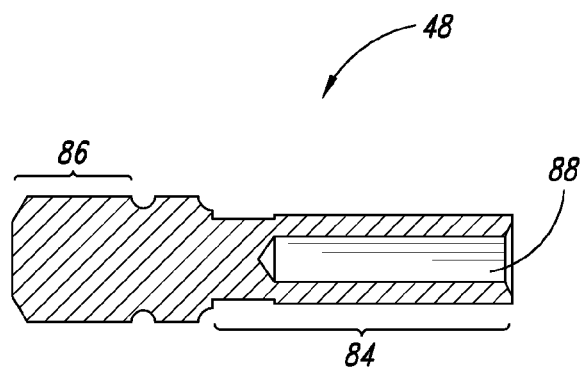
FIG. 7 is a longitudinal cross-sectional view of the tool-coupling member of the mandrel assembly of FIG. 2, according to one illustrated embodiment.

In addition to the aforementioned components of the mandrel assembly 14, FIG. 7 shows the tool-coupling member 48 having a first section 84 and a second section 86. The first section 84 includes a passage 88 formed at least partially through the body of the tool-coupling member 48. In one embodiment, the passage 88 is sized to closely receive the engagement section 50 of the inner rod 40, for example if the engagement section 50 is press fit into the passage 88. In another embodiment, the passage 88 is internally threaded to receive the externally threaded engagement section 50 of the inner rod 40. In a further embodiment, the passage 88 has a polygonal shape, for example hexagonal or octagonal, to receive a complementary shaped engagement section 50 of the inner rod 40. The second section 86 of the tool-coupling member 48 is configured to be received either by the adaptor 24 (FIG. 1B) or directly by the tool 12, for example if the adaptor 24 is integrally formed as part of the rod 22 of the tool 12.

Method of Using the Mandrel Assembly

Figure 8:
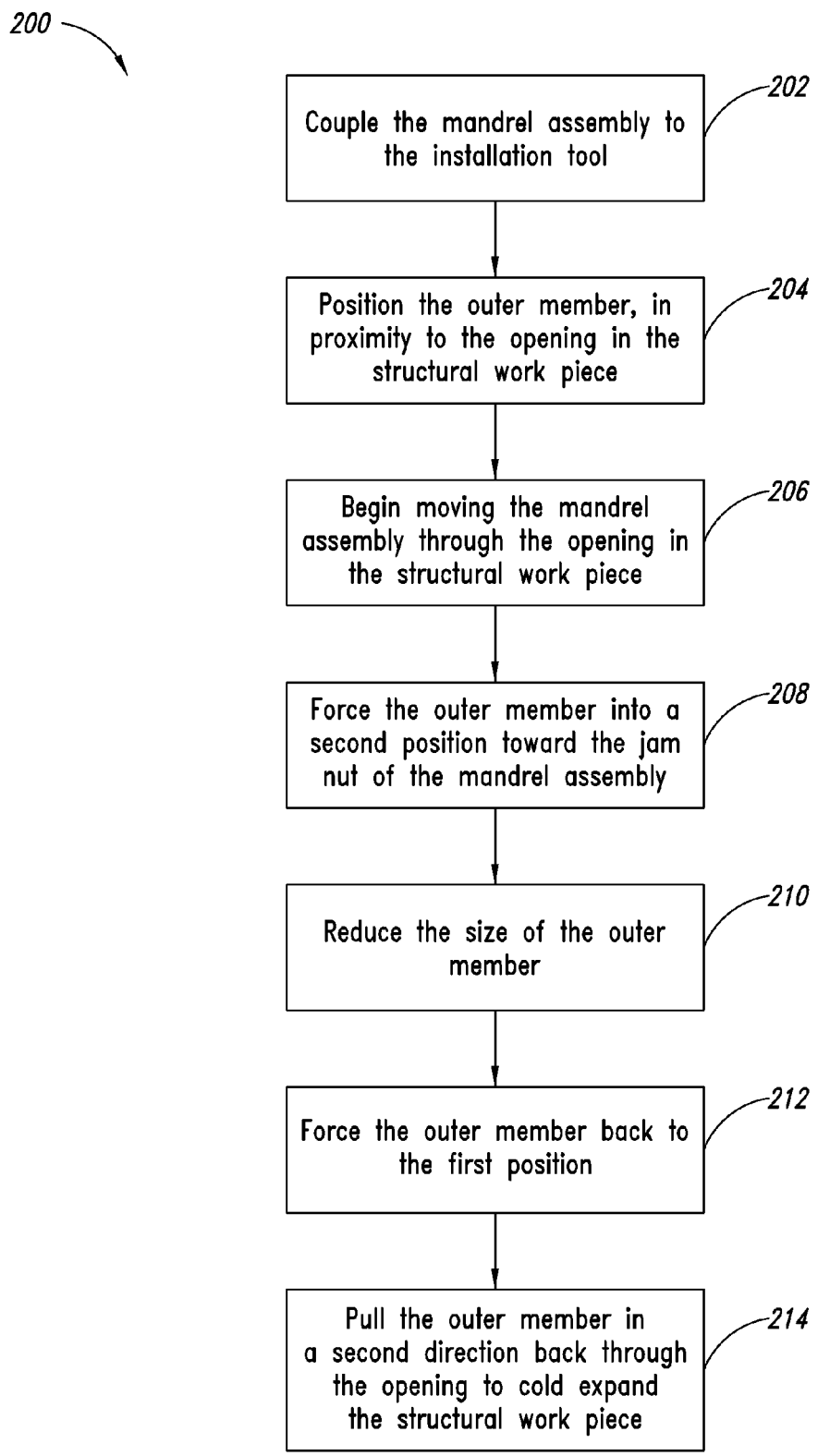
FIG. 8 is a flowchart showing a method of using the mandrel assembly of FIG. 2, according to one illustrated embodiment.
Figure 9E:
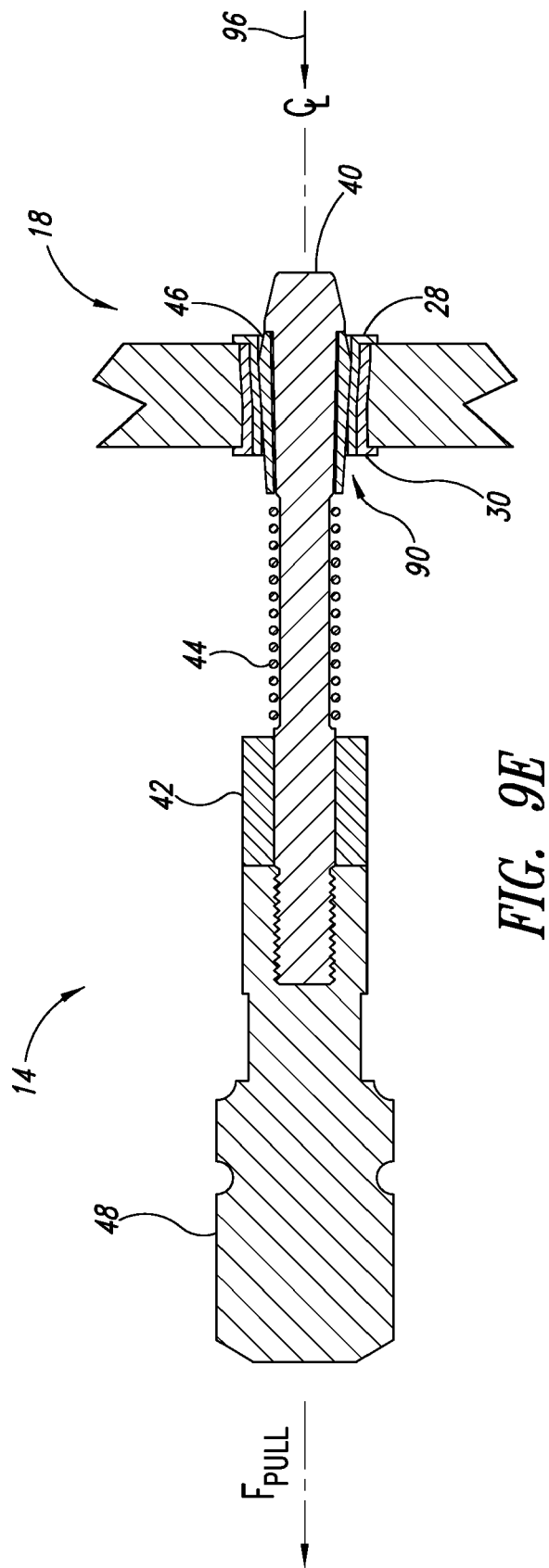

The flowchart of FIG. 8 in cooperation with FIGS. 9A-9E describe and show a method 200 of using the mandrel assembly 14 to cold expand the opening 16 in the structural workpiece 18. At 202 and as shown in FIG. 9A, the mandrel assembly 14 is coupled to the installation tool 12, either through the adaptor 24 or directly. At 204, the outer member 46 of the mandrel assembly 14 is placed in proximity to the opening 16 of the structural workpiece 18. The outer member 46 is located in a first position 90, which is generally when the second end 68 of the outer member 46 is adjacently positioned and/or in contact with the shoulder 60 of the head section 58 of the inner rod 40. The biasing member 44 can push the outer member 46 towards the shoulder 60 to keep the outer member 46 near or at the first position 90.

At 206 and as shown in FIG. 9B, the head section 58 of the inner rod 40 is inserted into the opening 16. The head section 58 is sized to be guided through the opening 16 without requiring a significant push force $F_{PUSH}$. With the outer member 46 still in the first position 90, the second tapered section 74 of the outer member 46 can make contact with the structural workpiece 18. The outer member 46 is pressed against the structural workpiece 18. Once the push force $F_{PUSH}$ is greater than the biasing force of the biasing member 44, the outer member 46 moved over the inner rod 40 towards the jam nut 42. The push force $F_{PUSH}$ applied to the mandrel assembly 14 is reacted by the structural workpiece 18 until the outer member 46 is moved towards the second position 92 (illustrated near the jam nut 42).

At 208 and as shown in FIG. 9C, the outer member 46 is forced substantially off of the contoured section 56 of the inner rod 40 and fully into the second position 92. The biasing member 44 is compressed as at least some of the kinetic energy is absorbed by the biasing member 44 due to the axial displacement of the outer member 46. Contemporaneously, the outer diameter along each portion of the outer member 46 is radially reduced as the outer member 46 is forced towards the second position 92. The outer member 46 thus contracts radially inward about the rod 40 while it moves towards the second position 92. The longitudinal slots 82 formed in the outer member 46 allow the outer member 46 to expand and contract radially with the advantage of not causing plastic deformation, strain hardening of the mandrel material, and other unwanted damage to the mandrel assembly 14.

At 210 and still referring to FIG. 9C, the outer member 46 collapses inwardly towards the inner rod 40 until the outer member 46 passes through the opening 16 in the first direction 20. The dimensions (e.g., the outer diameter) of the outer member 46 can be selected to allow the outer member 46 to pass through openings of various sizes. As the collapsed outer member 46 passes into and through the opening 16, the outer surface 211 of the outer member 46 can slide against an inner surface 215 of the opening 16. The frictional interaction between the outer member 46 can the inner surface 215 can be maintained at or below a desired level to limit or substantially prevent damage (e.g., striation marks, contact damage, and the like) to the inner surface 215 of the opening 16.

At 212 and shown in FIG. 9D, after the intermediate region 78 of the outer member 46 clears the opening 16, the biasing member 44 forces the outer member 46 along the inner rod 40 back into the first position 90. The outer member 46 can expand outwardly from the collapsed configuration to the expanded configuration, wherein the diameter of the intermediate region 78 is greater than the diameter of the opening 16. Thus, at least a portion of the outer member 46 is now positioned between the shoulder 60 and a blind side 94 of the structural workpiece 18.

At 214 and as shown in FIG. 9E, the installation tool 12 is actuated to pull the mandrel assembly 14 in the second direction 96. An engagement face 217 of the installation system 10 (see FIG. 1A) can rest against the work piece 18 to generate sufficient axial force $F_{PULL}$ for the expansion process. As the outer member 46 is forcibly pulled back through the opening 16 with a force $F_{PULL}$, the maximum outer diameter of the intermediate region 78 of the outer member 46 contacts and expands the opening 16 of the structural workpiece 18, which may or may not include the bushings 28, 30. It is appreciated that the radial expansion shown in FIG. 9E is exaggerated for illustrative purposes. In actuality, the amount of radial expansion may amount to micro-inches and will likely not be perceivable by an unassisted human eye.

Advantages of the Mandrel Assembly

One possible advantage of the mandrel assembly 14 is that it can include a standard tool-coupling member 48 that can fit into a variety of adaptors and/or installation tools.

Another possible advantage of the mandrel assembly 14 is that it can be used multiple times, unlike other mandrels used with disposable sleeve, such as a one-time use low-cost disposable sleeve made of non-tool steel. In addition, the mandrel assembly 14 can be used to cold expand an opening from only one side of the structural workpiece.

Additional and Alternate Embodiments of the Mandrel Assembly

Figure 10:
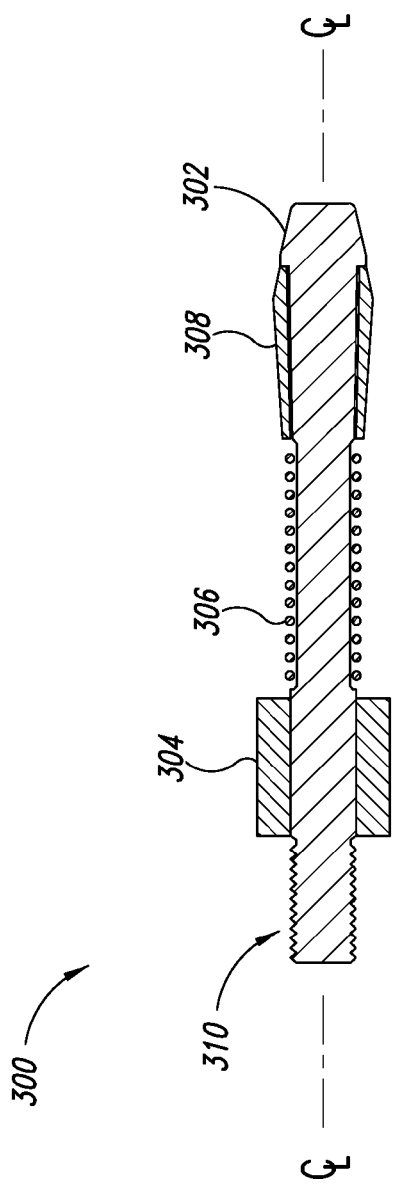
FIG. 10 is a cross-sectional view of a mandrel assembly having a mandrel with a tool-engagement portion that is externally threaded, according to one illustrated embodiment.
Figure 11:
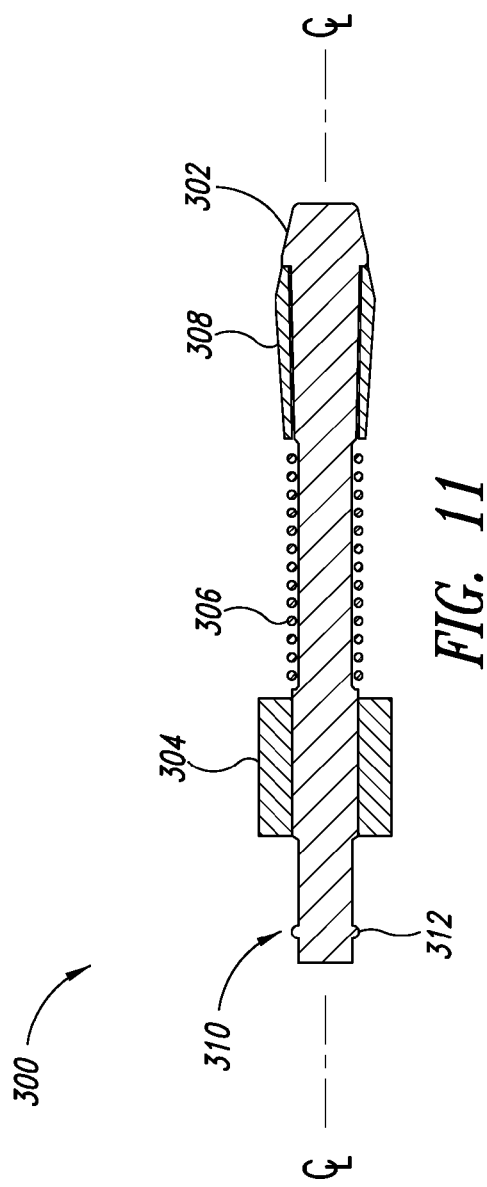
FIG. 11 is a cross-sectional view of a mandrel assembly having a mandrel with a tool-engagement portion that includes an engagement protuberance, according to one illustrated embodiment.

FIGS. 10 to 16 illustrate mandrel assemblies that may be generally similar to the mandrel assembly 14 discussed in connection with FIGS. 1 to 9. FIG. 10 shows a mandrel assembly 300 having an inner elongated rod 302, a jam nut 304, a biasing member 306, and a outer member 308 according to the illustrated embodiment. The mandrel assembly 300 does not include a tool-coupling as in the previous embodiments, but instead is attachable directly to the installation tool 12. As illustrated, a tool-engagement portion 310 of the mandrel 300 is configured to threadably engage the installation tool 12. FIG. 11 shows an alternate embodiment in which the tool-engagement portion 310 of the mandrel assembly 300 includes an engagement protuberance 312 for engaging either an adaptor or engaging the installation tool 12. It is understood that the tool-engagement portion 310 can take a variety of forms and can be engageable with the installation tool 12 in a variety of ways.

Figure 12:
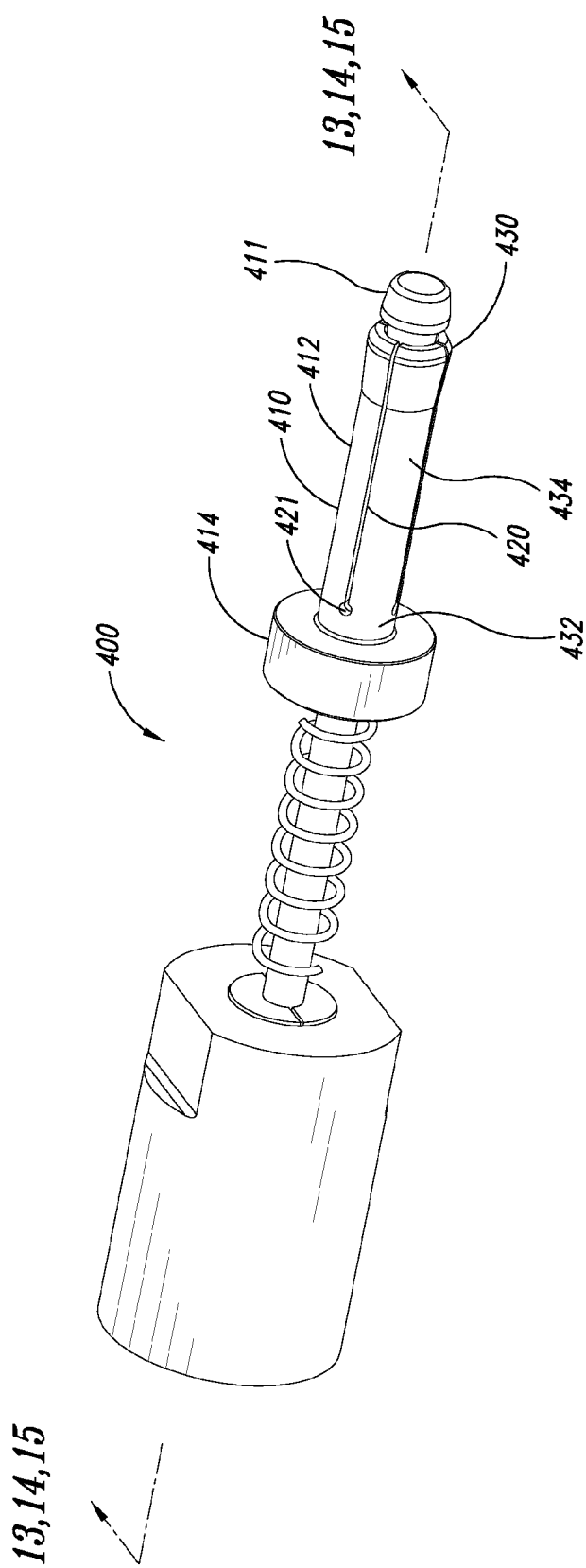
FIG. 12 is an isometric view of a mandrel assembly, according to one illustrated embodiment.
Figure 13:
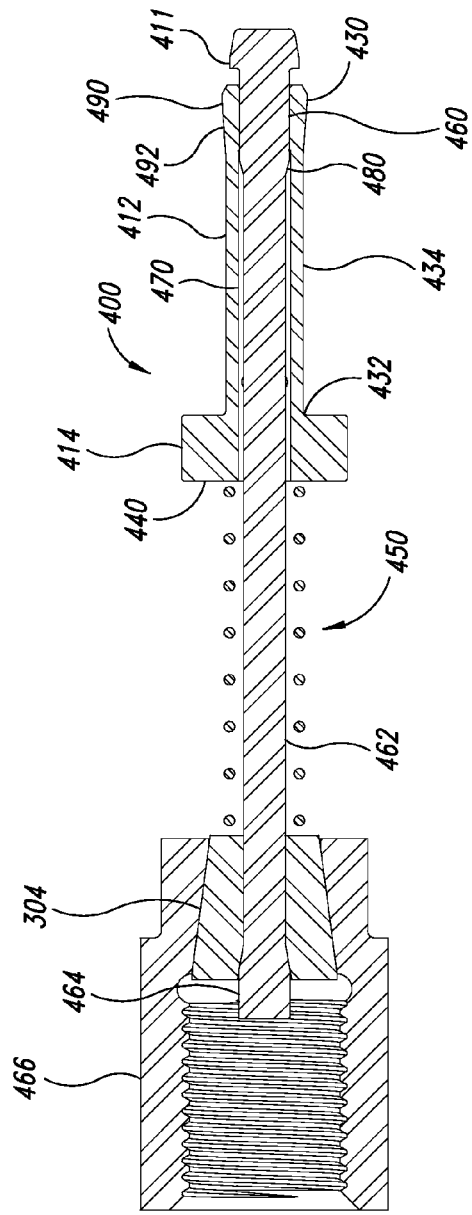
FIG. 13 is a cross-sectional view of the mandrel assembly of FIG. 12 taken along the line 13-13, wherein an outer member of the mandrel assembly is in an intermediate position.

FIGS. 12 and 13 show a mandrel assembly 400 including an outer member 410 slidably retained on an inner elongated rod 411. The illustrated outer member 410 of FIG. 13 is in an intermediate position but is movable relative to the rod 411 between a first position 421 (see FIG. 14) and a second position 425 (see FIG. 15).

Figure 14:
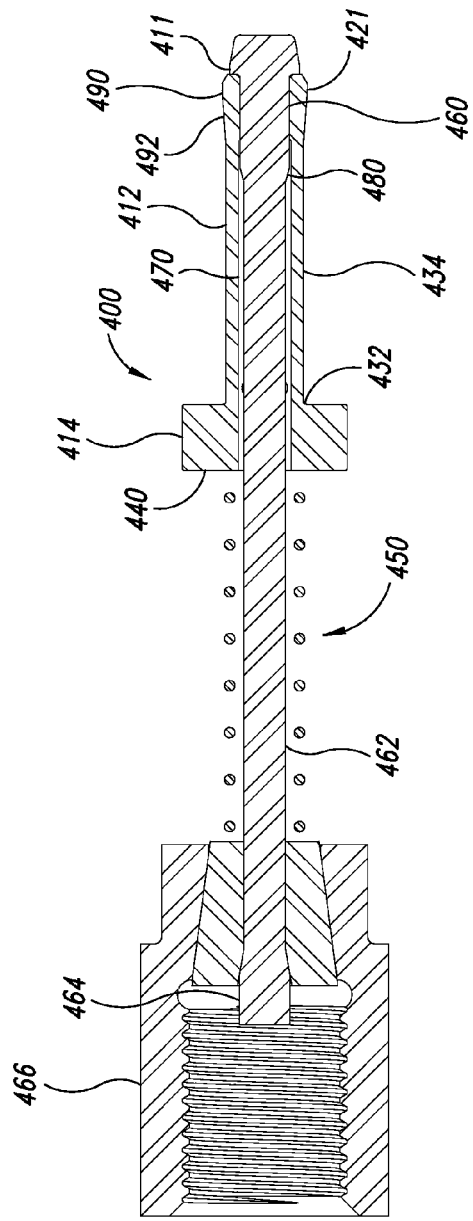
FIG. 14 is a cross-sectional view of the mandrel assembly of FIG. 12 taken along the line 14-14, wherein the outer member of the mandrel assembly is positioned to perform an expansion process.
Figure 15:
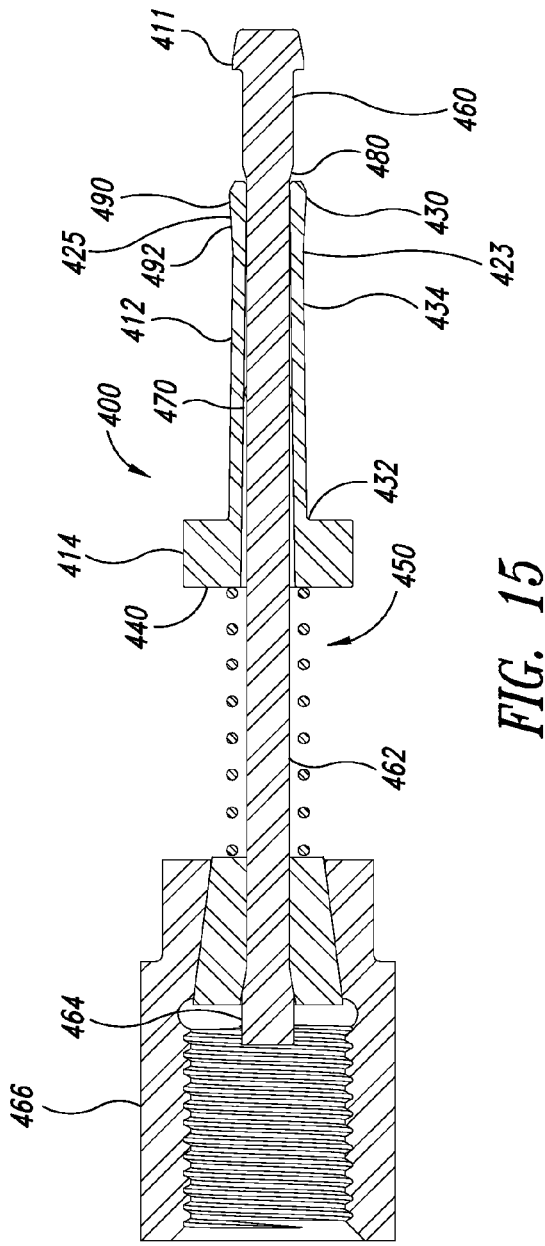
FIG. 15 is a cross-sectional view of the mandrel assembly of FIG. 12 taken along the line 15-15, wherein the outer member of the mandrel assembly is positioned for insertion into an opening of a workpiece.

The outer member 410 has an expandable portion 412 coupled to and extending from a backing 414. The expandable portion 412 is selectively moveable between an unexpanded low-profile configuration for passing through an opening in a workpiece and an expanded configuration for performing an expansion process. FIG. 14 shows the expandable member 412 in an expanded configuration defining an increased maximum circumference. In the illustrated embodiment of FIG. 15, the expandable portion 412 is in the unexpanded low-profile configuration defining a reduced maximum circumference.

Referring again to FIGS. 12 and 13, the expandable portion 412 includes a first end 430, a second end 432, a main body 434 extending between the ends 430, 432, and a plurality of circumferentially spaced longitudinal slots 420. The slots 420 extend from the first end 430 along the main body 434 towards the second end 432. The illustrated expandable portion 412 includes four somewhat evenly spaced slots 420. In other embodiments, the expandable portion 412 includes a greater or lesser number of slots, which may be evenly or unevenly spaced from each other, based on the desired forces required to radially displace the expandable portion 412.

As shown in FIG. 13, the expandable portion 412 includes a thickened portion 490 defining the maximum circumference of the expandable portion 412. When the thickened portion 490 engages an expandable or contoured section 460, the thickened portion 490 has a sloped outer surface 492 suitable for performing an expansion process.

The slots 420 extend partially through the expandable portion 412 in the longitudinal direction. In some embodiments, the axial lengths of the slots 420 are greater than the axial length of the expandable section 460, thereby permitting substantially elastic, resilient deformation of the expandable portion 412. In the illustrated embodiments, the ends 421 of the slots 420 are in proximity to, but spaced from, the backing 414. The number, spacing, widths, and lengths of the slots 420 can be selected based on the desired force suitable for actuating the outer member 410 along the elongated rod 411.

The backing 414 of FIG. 13 is coupled to the second end 432 of the expandable portion 412 and extends radially outward to define a seating face 440 for engaging the biasing member 450. The illustrated backing 414 with a generally circular axial cross-section is integrally formed with the expandable portion 412. Other types of backings or structures can be used to engage the biasing member 450.

The biasing member 450 can be directly or indirectly coupled to the second end 432 to the expandable portion 412. Welding, adhesives, fasteners, or other coupling means can be used to couple the biasing member 450 to the backing 414.

The inner rod 411 includes the expansion section 460 that slidably engages at least a portion of an inner surface 470 of the outer member 410. The illustrated inner rod 411 also includes a transition section 480 extending between the contoured section 460 and a central body 462. The central body 462 can extend between the transition section 480 and an engagement section 464. The illustrated engagement section 464 is disposed within a tool-coupling member 466.

Figure 16:
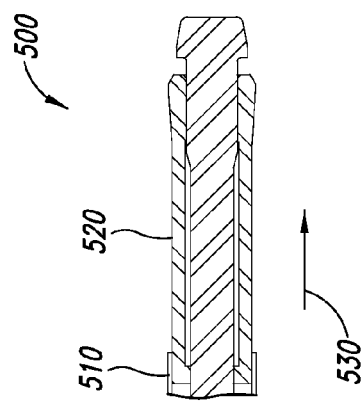
FIG. 16 is a longitudinal cross-sectional view of a portion of a mandrel assembly, according to one illustrated embodiment.

FIG. 16 shows a mandrel assembly 500 including a portion of an actuator 510 and an outer member 520 coupled to the actuator 510. The actuator 510 can be driven electrically, mechanically, pneumatically, hydraulically or by any other suitable drive means. In some embodiments, the actuator 510 is a solenoid that is activated to move the outer member 520 from the second position to the first position in the direction indicated by the arrow 530. In other embodiments, the actuator 510 is a pneumatically driven piston, such as a linearly reciprocating piston. The type and configuration of the actuator 510 can be selected to achieve the desired forces (e.g., pushing forces, pulling forces, torques, or combinations thereof) on the outer member 520. Alternatively or additionally, the outer members described herein can be moved along the inner rods manually or by an actuating device attached to the workpiece. One of ordinary skill in the art can select the appropriate means for moving the outer member based on the process to be performed.

The various embodiments described above can be combined to provide further embodiments. All of the above U.S. patents, patent applications and publications referred to in this specification as well as U.S. Pat. No. 3,566,662; U.S. Pat. No. 3,892,121; U.S. Pat. No. 4,471,643; U.S. Pat. No. 4,557,033; and U.S. Pat. No. 5,083,363 are incorporated herein by reference. Aspects can be modified, if necessary, to employ devices, features, and concepts of the various patents, applications and publications to provide yet further embodiments.

These and other changes can be made in light of the above detailed description. In general, in the following claims, the terms used should not be construed to limit the invention to the specific embodiments disclosed in the specification and the claims, but should be construed to include all types of mandrel assemblies and/or split sleeve components that operate in accordance with the claims. Accordingly, the invention is not limited by the disclosure, but instead its scope is to be determined entirely by the following claims.

What is claimed is:

1. An installation system for expanding an opening in a workpiece, the installation system comprising:
    a mandrel assembly receivable by an installation tool, the mandrel assembly including:
        a rod having an engagement section for coupling to the installation tool and a substantially non-tapered section, the rod including a head section distal to the non-tapered section; and
        an outer member movable along the rod between a first position and a second position, the outer member having a collapsed configuration for passing through the opening of the workpiece when in the first position and having an expanded configuration for expanding the opening of the workpiece when in the second position, the outer member surrounding and engaging the non-tapered section when in the second position, the outer member positioned on the rod between the head section and the rod engagement section so that axial movement of the outer member along the rod away from the engagement section of the rod is limited by the head section of the rod.

2. The installation system of claim 1, wherein the non-tapered section keeps the outer member in the expanded configuration when the outer member is in the second position.

3. The installation system of claim 1, wherein substantially an entire portion of an inner surface of the outer member surrounding the non-tapered section physically contacts the non-tapered section when the outer member is in the second position.

4. The installation system of claim 1, wherein the non-tapered section has a longitudinal length that is greater than a distance from an end of the outer member to an expansion section of the outer member relative to a longitudinal axis of the rod, and the expansion section defines a maximum outer diameter of the outer member.

5. The installation system of claim 1, wherein the outer member has a plurality of longitudinal slots, and at least one of the longitudinal slots has a length that is greater than a longitudinal length of the non-tapered section.

6. The installation system of claim 1, wherein the outer member includes four slots evenly spaced apart from one another about a circumference of the outer member.

7. The installation system of claim 1, further comprising:
    an installation tool configured to receive and hold the engagement section of the mandrel.

8. The installation system of claim 1, wherein the outer member includes a unitary body having a plurality of slots that define deflectable arms that are held in the expanded configuration by the non-tapered section when the outer member surrounds the non-tapered section.

9. An installation system for expanding an opening in a workpiece, the installation system comprising:
a mandrel assembly receivable by an installation tool, the mandrel assembly including:
a rod having an engagement section for coupling to the installation tool and a substantially non-tapered section; and
an outer member movable along the rod between a first position and a second position, the outer member having a collapsed configuration for passing through the opening of the workpiece when in the first position and having an expanded configuration for expanding the opening of the workpiece when in the second position, the outer member surrounding and engaging the non-tapered section when in the position,
wherein the rod further comprises a head, the non-tapered section is positioned between the head and the engagement section such that an expansion section of the outer member is positioned radially outward of the non-tapered section relative to a longitudinal axis of the rod when the outer member is adjacent the head, and the expansion section of the outer member defines a maximum outer diameter of the outer member.

10. An installation system for expanding an opening in a workpiece, the installation system comprising:
a mandrel assembly receivable by an installation tool, the mandrel assembly including:
a rod having an engagement section for coupling to the installation tool and a substantially non-tapered section; and
an outer member movable along the rod between a first position and a second position, the outer member having a collapsed configuration for passing through the opening of the workpiece when in the first position and having an expanded configuration for expanding the opening of the workpiece when in the second position, the outer member surrounding and engaging the non-tapered section when in the position, the outer member extending from a first end to a second end and including a plurality of longitudinal slots, and at least one of the longitudinal slots having a length that is greater than a longitudinal length of the non-tapered section,
wherein a first set of the plurality of longitudinal slots extend from a first end of the outer member and a second set of the plurality of longitudinal slots extend from a second end of the outer member.

11. An installation system for expanding an opening in a workpiece, the installation system comprising:
a mandrel assembly receivable by an installation tool, the mandrel assembly including:
a rod having an engagement section for coupling to the installation tool and a substantially non-tapered section; and
an outer member movable along the rod between a first position and a second position, the outer member having a collapsed configuration for passing through the opening of the workpiece when in the first position and having an expanded configuration for expanding the opening of the workpiece when in the second position, the outer member surrounding and engaging the non-tapered section when in the position,
wherein the rod includes a stepped diameter section, and the non-tapered section is located between the stepped diameter section and a head of the rod.

12. An installation system for expanding an opening in a workpiece, the installation system comprising:
a mandrel assembly receivable by an installation tool, the mandrel assembly including:
a rod having an engagement section for coupling to the installation tool and a substantially non-tapered section;
an outer member movable along the rod between a first position and a second position, the outer member having a collapsed configuration for passing through the opening of the workpiece when in the first position and having an expanded configuration for expanding the opening of the workpiece when in the second position, the outer member surrounding and engaging the non-tapered section when in the position; and
a biasing member surrounding the rod, wherein the outer member has a first end and a second end, the first end of the outer member is positioned to engage the biasing member, and the second end of the outer member is engageable with a shoulder of a head of the rod to limit axial movement of the outer member along the rod away from the engagement section of the rod.

13. A method of expanding an opening in a workpiece, the method comprising:
positioning a mandrel assembly on a first side of the workpiece, the mandrel assembly including a rod and an outer member surrounding the rod, the outer member initially biased against a head of the rod while the mandrel assembly is positioned on the first side of the workpiece;
moving at least a portion of the rod and at least a portion of the outer member through the opening to a second side of the workpiece while the outer member is in a collapsed configuration;
causing the portion of the outer member on the second side of the workpiece to expand from the collapsed configuration to an expanded configuration while the rod extends through the opening such that a substantially non-tapered section of the rod holds the outer member in the expanded configuration; and
moving the mandrel assembly relative to the workpiece to expand the opening using the outer member held in the expanded configuration by the non-tapered section.

14. The method of claim 13, further comprising sliding the outer member along the rod towards the head of the rod to move the outer member from the collapsed configuration to the expanded configuration.

15. The method of claim 13, further comprising holding the outer member in the expanded configuration while substantially an entire portion of an inner surface of the outer member surrounds and physically contacts the non-tapered section to keep the outer member in the expanded configuration.

16. The method of claim 13, wherein the non-tapered section has a longitudinal length that is greater than a distance from an end of the outer member to an expansion section of the outer member relative to a longitudinal axis of the rod, and the expansion section defines a maximum outer diameter of the outer member.

17. The method of claim 13, wherein moving the at least a portion of the rod to the second side of the workpiece comprises moving at least a portion of the non-tapered section of the rod through the opening to the second side of the workpiece.

* * * * *